United States Patent Office 3,763,161
Patented Oct. 2, 1973

3,763,161
TETRASUBSTITUTED DICYANOPYRAZINES AND
RELATED COMPOUNDS
Donald R. Hartter, Wilmington, Del., assignor to E. I. du
Pont de Nemours and Company, Wilmington, Del.
No Drawing. Filed July 13, 1970, Ser. No. 54,617
Int. Cl. C07d 51/76
U.S. Cl. 260—250 R    6 Claims

ABSTRACT OF THE DISCLOSURE

Certain novel cyano-substituted pyrazines, e.g., tetracyanopyrazine, are obtained, for example, from diiminosuccinonitrile and/or diaminomaleonitrile. The novel compounds oxalyl cyanide and iminooxalyl cyanide are also described.

BACKGROUND OF THE INVENTION

(1) Field of the invention

This invention relates to, and has as its principal objects provision of, certain novel cyano-substituted pyrazines and their synthesis. Oxalyl cyanide and iminooxalyl cyanide are important intermediates and are also considered as part of the invention.

(2) Relation to prior art

Pyrazines, as a class of heterocyclic compounds, have long been known.

H. Bredereck and G. Schmötzer, Ann., 600, 95 (1956), for example, reported the preparation of 2,3-dioxo-1,2,3,4-tetrahydropyrazine-5,6-dinitrile (X), related to the presently claimed pyrazines:

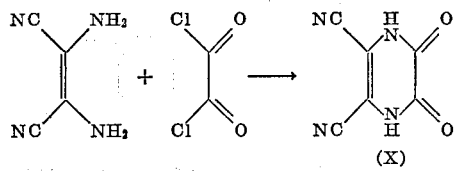

(X)

The pyrazines of this invention, however, have not been reported. Several other compounds as well as the synthesis of the present invention are similarly new.

Webster, U.S. Pat. 3,564,039 of Feb. 16, 1971, discusses the relatively novel compound diiminosuccinonitrile and the known hydrogen cyanide tetramer, diaminomaleonitrile.

SUMMARY AND DETAILS OF THE INVENTION

This invention is primarily concerned (A) with the reaction of diiminosuccinonitrile with diaminomaleonitrile and (B) with the family of ten products obtained therefrom, all but one of which are new compositions of matter.

The nine new products are as follows:

(I) Tetracyanopyrazine

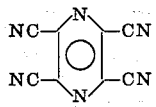

(II) 2-hydroxy-3,5,6-tricyanopyrazine

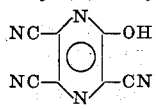

(III) 2-amino-3,5,6-tricyanopyrazine

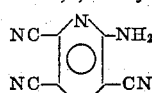

(IV) 2-amino-3-hydroxy-5,6-dicyanopyrazine

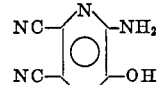

(V) 2,3-diamino-5,6-dicyanopyrazine

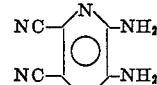

(VI) 2,5-diamino-3-cyano-6-imino-4-azahepta-2,4-dienedinitrile

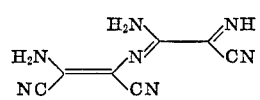

(VII) 2,5,6,9-tetraamino-3,8-dicyano-4,7-diazadeca-2,4,6,8-tetraenedinitrile

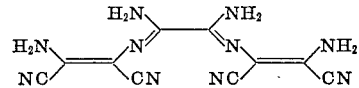

(VIII) α-Iminooxalyl cyanide (IX) Oxalyl cyanide

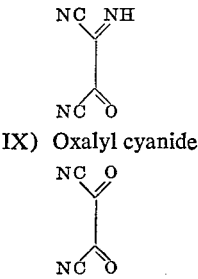

As noted above, the tenth compound, 2,3-dioxo-1,2,3,4-tetrahydropyrazine-5,6-dinitrile (X), has been prepared by another route.

The process of this invention involves the reaction of diiminosuccinonitrile with diaminomaleonitrile in the presence or absence of a Lewis acid, a Lewis base, a liquid reaction medium (solvent) and/or water. When water is present all 10 of the numbered compounds above are formed. When water is absent, only compounds I, III, V, VI and VII are formed.

By varying the amount and type of Lewis acid, Lewis base, reaction medium and/or water as well as the time of reaction, it is possible to alter the proportions of the products formed so that the individual products can be isolated. This is most surprising in view of the complexity of the chemical reaction and the large number of products that are always present, at least in minimal amounts. Compounds VI, VIII and IX are best isolated after relatively short reaction times since compound VI cyclizes to form compound V, compound VIII reacts further to form compounds III and IV and compound IX reacts further to form compounds I, II, and X.

A Lewis acid is a substance that can accept one or more electrons from another substance to form a chemical bond. Lewis acids include not only protonic materials such as the specific acids mentioned throughout the specification, but also aprotonic materials such as boron, trifluoride, silicon tetrachloride, phosphorus pentoxide, sulfur dioxide, aluminum chloride, antimony pentachloride, ferric chloride, stannic chloride, boron trichloride, titanium tetrachloride, zinc bromide, zinc chloride, and the like.

A Lewis base is a substance that can donate one or more electrons to another substance to form a chemical bond. Lewis bases include the strongly basic aqueous solutions of metal oxides and hydroxides such as sodium and potassium hydroxides as well as weaker basic materials such as ammonium hydroxide and alkyl- and aryl-substituted amines.

The presence of a liquid reaction medium is not essential, since diiminosuccinonitrile and diaminomaleonitrile can be induced to react by long term impact grinding as in a hammer mill or ball mill. However, it is preferred to carry out the reaction in the presence of an organic liquid which is inert to the reactants and products. Particularly preferred are the aprotic organic liquids, e.g., nitriles such as acetonitrile and benzonitrile, ethers such as diethyl ether, tetrahydrofuran, ethylene glycol dimethyl ether and diethylene glycol dimethyl ether, and hydrocarbons such as hexane, benzene, toluene and xylene. Some of the most useful of these aprotic liquids are the ones which are water miscible. When one of the reactants is a liquid, an excess of that reactant may serve as a reaction medium. For example, an excess of a Lewis acid such as trifluoroacetic acid may serve as a reaction medium. Similarly, an excess of a Lewis base such as triethylamine or N,N-dimethylaniline can serve as reaction medium.

The process of this invention may be carried out in the temperature range from −80° C. to 200° C. It is preferred to operate in the range from 0° C. to 100° C.

Pressure is not a critical variable in the process of this invention. Pressures above and below atmospheric pressure may be employed. Atmospheric pressure is preferred for convenience.

The proportions of diiminosuccinonitrile and diaminomaleonitrile which may be brought together to carry out the process of this invention may be varied widely, since any proportions used will give at least some of the products. Molar ratios from 1:20 to 20:1 may be employed, and respective molar proportions in the range from 5:1 to 1:6 are preferred.

The bulk of this invention is concerned with five novel dicyanopyrazines of the general structural formula:

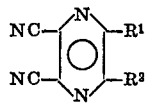

wherein: $R^1$ may be cyano, amino, or hydroxy and $R^2$ may be cyano or amino. These new pyrazines are all made from diiminosuccinonitrile and/or diaminomaleonitrile by processes that constitute an important part of the invention. The several syntheses are closely related and are described in detail below.

2,3-diamino-5,6-dicyanopyrazine (V), the compound of the general formula in which $R^1=R^2=NH_2$, can be prepared more simply than the other compounds, e.g., by heating diaminomaleonitrile and cyanogen or by reaction of diaminomaleonitrile with sodium hydride at 5–10° C., followed by addition of cyanogen at −30° C. to −35° C. The preferred synthesis, however, is the sulfuric acid-catalyzed condensation of diiminosuccinonitrile with diaminomaleonitrile in acetonitrile solution. V can also be prepared by the cyclization of VI.

The other pyrazines of the invention are formed by complex reactions in which the reaction mechanisms are not fully known. One explanation of the several courses of the reaction is based on the observation that p-toluenesulfonic acid (TsOH) precipitates as the ammonium salt (NH₄TsO), i.e., ammonium tosylate, on reaction with diiminosuccinonitrile, presumably to form α-iminoöxalyl cyanide:

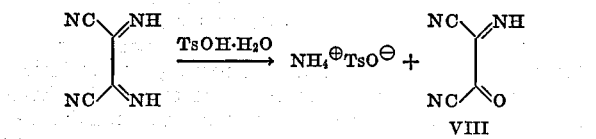

Addition of diaminomaleonitrile to the above solution followed by heating, if desired, results in the formation of pyrazines. When one mole proportion of p-toluenesulfonic acid per mole of diiminosuccinonitrile is employed, the pyrazines 2-amino-3,5,6-tricyanopyrazine, III, and 2-amino-3-hydroxy-5,6-dicyanopyrazine, IV, are formed:

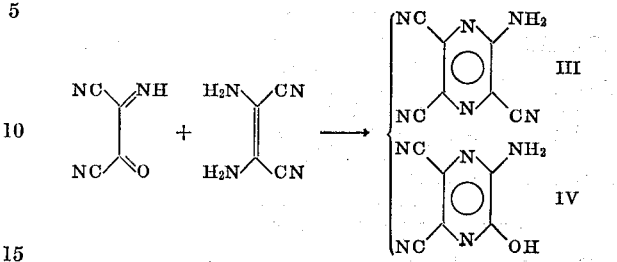

When two moles of p-toluenesulfonic acid per mole of diiminosuccinonitrile are used, subsequent reaction with diaminomaleonitrile yields the pyrazines I and II, along with 2,3-dioxo-1,2,3,4-tetrahydropyrazine - 5,6 - dinitrile (X). The analogous intermediate in these reactions may reasonably be oxalyl cyanide:

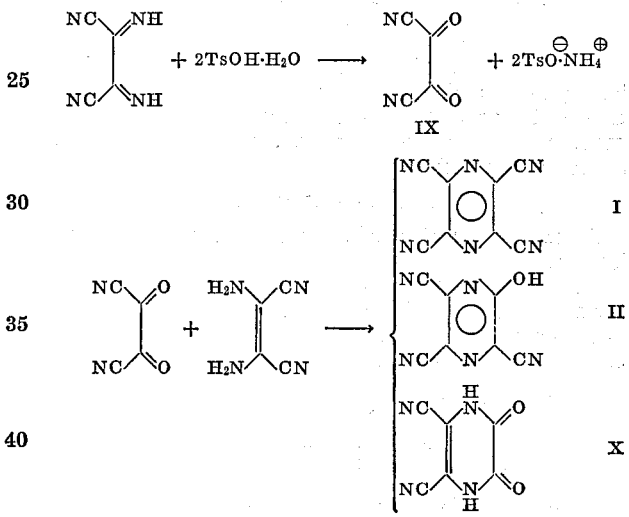

The hydrolysis of diiminosuccinonitrile to yield Compounds VIII and IX may be effected by water and any strong mineral acid such as sulfuric, phosphoric, hydrochloric, hydrobromic, and phosphorous acids, as well as by organic acids having dissociation constants above $1 \times 10^{-3}$. The latter class of acids includes the alkane- and arenesulfonic acids and alkane- and arenecarboxylic acids, such as mono-, di- and trichloroacetic acids, the bromoacetic acids, the fluoroacetic acids, oxalic acid, maleic acid, and p-nitrobenzoic acid. The arenesulfonic acids are preferred on the basis of availability and insolubility of the ammonium salts in the solvents used in the invention.

The preferred solvets for the syntheses of this invention are tetrahydrofuran, acetonitrile, diethyl ether, water, and aqueous acids. Other solvents include glycol dimethyl ether, dioxane, trifluoroacetic acid and alcohol solutions of acids such as hydrochloric or sulfuric acids.

EMBODIMENTS OF THE INVENTION

There follow some nonlimiting examples illustrative of the invention in more detail. The captions before groups of examples indicate the novel product of principal concern therein.

COMPOUND V: 2,3-DIAMINO-5,6-DICYANOPYRAZINE

Example 1

(A) Concentrated sulfuric acid (1.3 ml.) was added, in one portion, to a stirred solution of 50.0 g. (0.472 mole) of diiminosuccinonitrile and 46.0 g. (0.426 mole) of diaminomaleonitrile in 800 ml. of acetonitrile at 30° C. The temperature rose rapidly to 46° C. and a yellow precipitate formed. The precipitate dissolved within 30 seconds and the solution became brown and the temperature continued to rise to 54° C. The product (2,3-diamino-5,6-dicyanopyrazine; compound V) began to precipitate in small crystals. The reaction mixture was stirred for a total of 1 hr., then cooled to −20° C. and the product collected on a filter. The brown crystalline solid was washed successively with acetonitrile and ether to give 40.7 g. (59.7% yield) of 2,3-diamino-5,6-dicyanopyrazine as light gray crystals.

(B) Substantial repetition of A, above, but with tetrahydrofuran as solvent, gave a 44.6% yield of 2,3-diamino-5,6-dicyanopyrazine.

Example 2

A solution of the diaminomaleonitrile anion was prepared by adding a solution of 5.4 g. (50 mmoles) of diaminomaleonitrile in 100 ml. of anhydrous glycol dimethyl ether to 1.20 g. (50 mmoles) of sodium hydride at 5–10° C. over a period of 25 minutes, followed by stirring at 25° C. for 2 hours. Then an additional 100 ml. of anhydrous glycol dimethyl ether was added and the resulting heterogeneous solution of orange-colored diaminomaleonitrile anion was cooled to −35° C. and 4 ml. of cyanogen was allowed to distill into the reaction vessel over a 20-minute period. Stirring at −30 to −35° C. was continued for 45 minutes after the cyanogen addition. Then 4 ml. of glacial acetic acid was added, the reaction mixture warmed to room temperature and filtered. The filtrate was preabsorbed on 50 g. of silica gel (Silic AR CC7) and chromatographed. Elution with ether removed 1.56 g. (19.5%) of 2,3-diamino-5,6-dicyanopyrazine.

Example 3

The simple thermal condensation of diaminomaleonitrile and cyanogen is illustrated as follows:

Diaminomaleonitrile (33 g., 0.305 mole) in 400 ml. of $CH_3CN$ was heated with 33 g. (0.635 mole) of cyanogen in a Hastelloy® C bomb at 120° C. for 12 hours. The insoluble polymer was removed by filtration. The filtrate was then refluxed with 10 g. of decolorizing charcoal (Darco®), filtered and concentrated to 50 ml. On standing, 2.35 g. of 2,3-diamino-5,6-dicyanopyrazine crystallized in white plates, M.P. 332° C. (dec.). The 2,3-diamino-5,6-dicyanopyrazine can also be satisfactorily recrystallized from acetone.

Examples 4–12, as set forth in Table I, further illustrate the synthesis of 2,3-diamino-5,6-dicyanopyrazine and indicate the best conditions for preparation from cyanogen and diaminomaleonitrile.

The following analyses and spectral data characterize 2,3-diamino-5,6-dicyanopyrazine, V, and confirm the assigned structure:

Analysis.—Calcd. for $C_6H_4N_6$ (percent): C, 45.00; H, 2.52; N, 52.48. Found (percent): C, 45.06, 45.14; H, 2.32, 2.32; N, 52.35; 52.86.

IR: 3640, 3400, 3320, 3160 cm.$^{-1}$ ($NH_2$); 2230 cm.$^{-1}$ (C≡N); 1675, 1630 cm.$^{-1}$ ($NH_2$ deformations); 1560, 1520, 1505 cm.$^{-1}$ C=C/C=N).

UV: $\lambda_{max.}^{CH_3CN}$ 227 m$\mu$ ($\epsilon$ 25,050), 317 m$\mu$ ($\epsilon$ 17,450).

HIGH RESOLUTION MASS SPECTROMETRY

| M./e. (meas.) | M./e. (calcd.) | Assignment |
|---|---|---|
| 160.0502 | 160.0497 $C_6H_4N_6$ | (M+, molecular ion). |
| 133.0395 | 133.0388 $C_5H_3N_5$ | (M+, −HCN). |
| 106.0 | | (M+, −2HCN). |
| 90.0 | | |

It will be seen from Examples 4–12 (Table I) that the thermal condensation of diaminomaleonitrile with cyanogen is critical as to operable temperatures. The operable temperature range is 120° C. to 200° C. and preferably ranges from 120–130° C. Other reaction variables are of minor importance, e.g., the proportion of solvent makes little difference and the mole ratio of cyanogen to diaminomaleonitrile is usually about 2:1, though other ratios of reactants are operable.

Example 13

A 5-liter, three-necked flask fitted with a reflux condenser and addition funnel was charged with 18.0 g. (0.167 mole) of diaminomaleonitrile, 5.0 ml. of diisopropylethylamine and 2000 ml. of acetonitrile. The addition funnel was charged with 54.0 g. (0.510 mole) of diiminosuccinonitrile dissolved in 500 ml. of acetonitrile. The solution in the flask was blanketed with nitrogen and heated to reflux. The diiminosuccinonitrile solution was added dropwise over 1 hour and 40 minutes, after which the mixture was refluxed for an additional 6 hours. The mixture was cooled to room temperature, treated with ca. 20 g. of Darco® and filtered. The filtrate was evaporated to dryness in vacuum on a rotary evaporator. The residual black powder was leached three times with ca. 500 ml. of boiling ether to obtain 2.4 g. (9% yield) of 2,3-diamino-5,6-dicyanopyrazine.

Example 14

To a solution of 6.0 g. of diiminosuccinonitrile and 6.0 g. of diaminomaleonitrile in 150 ml. of tetrahydrofuran was added 5 drops of concentrated sulfuric acid. Within 15 seconds the temperature rose from 25° C. to 41° C. and within 3 minutes a precipitate began to form and the solution started to turn dark. After 2 hours the reaction appeared to be complete. The reaction mixture was filtered and the precipitate collected to obtain 2.5 g. of 2,3-diamino-5,6-dicyanopyrazine in the form of a gray solid. Part of the solvent was evaporated from the filtrate and the resulting precipitate was separated to yield another 2.0 g. of compound V. Evaporation of the remaining filtrate to dryness gave 4.25 g. of dark brown solid which consisted mostly of 2-amino-3,5,6-tricyanopyrazine (III). The two crops of 2,3-diamino-5,6-dicyanopyrazine were combined, dissolved in 1 liter of hot acetonitrile, treated with decolorizing carbon and recyrstallized to obtain the purified compound V in the form of colorless platelet crystals.

Example 15

A mixture of 5.0 g. each of diiminosuccinonitrile and diaminomaleonitrile in 150 ml. of acetonitrile was heated

TABLE I

| Ex. No. | Diaminomaleonitrile (g.) | NC—CN (g.) | $CH_3CN$ (ml.) | Conditions (° C./hours) | 2,3-diamino-5,6-dicyanopyrazine (g.) | Yield (percent) |
|---|---|---|---|---|---|---|
| 4 | 5 | 5 | 100 | 80/6 | No reaction | |
| 5 | 20 | 20 | 300 | 100/12 | Only slight reaction. | |
| 6 | 20 | 20 | 300 | 115/8 | None | |
| 7 | 50 | 50 | 700 | 120/8 | 2.54 | 3.4 |
| 8 | 26 | 26 | 400 | 120/9 | 1.53 | 4.0 |
| 9 | 5 | 15 | 100 | 120/10 | 0.125 | 1.7 |
| 10 | 20 | 40 | 400 | 120/12 | 1.50 | 5.1 |
| 11 | 40 | 40 | 700 | 120/12 | 3.30 | 5.6 |
| 12 | 40 | 50 | 300 | 130/18 | 2.17 | 3.7 | at reflux for 4 days. The polymeric material was filtered and the filtrate chromatographed (column) to yield 50 mg. of pure pyrazine V.

Example 16

A solution of compound VI (486 mg.) was refluxed in 250 ml. of acetonitrile for 3 days. The resulting solution was refluxed with 0.5 g. of Darco®, filtered, preabsorbed on 5 g. of silica gel (Silic AR CC7) and chromatographed. Elution with $CHCl_3$ removed 20 mg. of a by-product and then elution with ether removed 168 mg. (40.5%) of 2,3-diamino-5,6-dicyanopyrazine.

COMPOUNDS VI AND VII: 2,5-DIAMINO-3-CYANO-6-IMINO-4-AZAHEPTA - 2,4 - DIENEDINITRILE AND 2,5,6,9-TETRAAMINO - 3,8 - DICYANO-4,7-DIAZADECA-2,4,6,8-TETRAENEDINITRILE

Example 17

A solution of 20.0 g. (0.189 mole) of diiminosuccinonitrile and 20.0 g. (0.185 mole) of diaminomaleonitrile in 600 ml. of acetonitrile was stirred at 60° C. for 3 days. The resulting viscous black slurry was filtered while hot to separate uncharacterized polymeric material. The filtrate was refluxed with 5 g. of decolorizing charcoal, filtered and, on standing, deposited 1.24 g. of 2,5,6,9-tetraamino - 3,8 - dicyano - 4,7 - diazadeca - 2,4,6,8 - tetraenedinitrile (VII).

The filtrate from this sample was evaporated to dryness leaving an orange solid which was slurried with 100 ml. of ether and filtered to collect 13.74 g. of 60:40 mixture of VII and 2,5-diamino-6-imino-3-cyano-4-azahepta-2,4-dienedinitrile (VI). Thus, the total yields of VII and VI were 9.48 g. (38.2%) and 5.50 g. (15.9%), respectively.

VI and VII can be separated by column chromatography on silica gel (preferably Mallinckrodt's Silic AR CC7 100–200 mesh). VI and VII are eluted with $CH_2Cl_2$ and $CH_3CN$, respectively. Solubility differences can also be employed for crude separations. VII is only sparingly soluble in hot $CH_3CN$ while VI is soluble. Thus $CH_3CN$ can be employed for leaching VI from mixtures of VI and VII. VI can be recrystallized from $CH_3CN$, M.P. 204° (dec.). Dissolution of VII in dimethyl formamide, followed by reprecipitation with water gives pure samples, M.P. 249° (dec.).

Example 18

(A) A 2-liter, three-necked flask fitted with a reflux condenser and addition funnel was charged with 6.0 g. (0.0556 mole) of diaminomaleonitrile, 400 ml. of acetonitrile and 2.0 ml. of N,N-dimethylaniline. The addition funnel was charged with 12.0 g. (0.103 mole) of diiminosuccinonitrile, dissolved in 300 ml. of acetonitrile. The solution was stirred (magnetic) at room temperature while the diiminosuccinonitrile solution was added rapidly. There was no sign of reaction until the mixture was heated to reflux at which time the solution darkened and hydrogen cyanide began to evolve. After refluxing for 12 hours, the mixture was worked up, the crude product adsorbed on 50 g. of silica gel and eluted with diethyl ether to yield 5.75 g. of 2,5-diamino-3-cyano-6-imino - 4 - azahepta - 2,4 - dienedinitrile (VI) containing a trace of 2,3-diamino-5,6-dicyanopyrazine.

(B) The above product was dissolved in 300 ml. of acetonitrile containing 2.0 ml. of triethylamine and refluxed for 20 hours. The usual isolation procedure gave 1.73 g. (19.5%) of 2,3-diamino-5,6-dicyanopyrazine (V).

Example 19

A mixture of 5.0 g. of diiminosuccinonitrile and 5.0 g. of diaminomaleonitrile was dissolved in 100 ml. of tetrahydrofuran. Ten ml. of glacial acetic acid was added and the resulting solution was stirred at room temperature for 18 hours. It slowly turned dark. The reaction mixture was evaporated to dryness to yield a black solid. This solid was slurried with 500 ml. of acetonitrile and the undissolved material was collected by filtration to give 4.35 g. of 2,5,6,9-tetraamino-3,8-dicyano-4,7-diazadeca - 2,4,6,8 - tetraenedinitrile (VII) (69.5% yield). Evaporation of the acetonitrile from the filtrate gave 2.24 g. of 2,5-diamino-3-cyano-6-imino-4-azahepta-2,4-dienedinitrile (VI) (26.1% yield).

COMPOUNDS III AND IV: 2-AMINO-3,5,6-TRICYANOPYRAZINE AND 2-AMINO-3-HYDROXY-5,6-DICYANOPYRAZINE

Example 20

A solution of 37 g. (0.20 mole) of p-toluenesulfonic acid monohydrate in 400 ml. of ether-$CH_3CN$ (50:50) was added in 1 hour to a stirred solution of 21.2 g. (0.20 mole) of diiminosuccinonitrile in 400 ml. of ether-$CH_3CN$ (50:50) under a nitrogen atmosphere while maintaining the temperature at 25° C. Stirring at room temperature was continued for an additional hour and the reaction mixture was filtered under nitrogen into a clean flask. The filtrate contained α-iminooxalylcyanide (VIII).

Powdered diaminomaleonitrile (10.8 g., 0.10 mole) was added to the filtrate (10 minutes) and this solution was stirred at 45° C. for 3 days, filtered and preabsorbed on 100 g. of silica gel (Mallinckrodt's Silic AR CC7, 100–200 mesh). The dry preabsorbed silica gel was subsequently placed with petroleum ether on 150 g. of fresh silica gel (Silic AR CC7) in a 4-inch diameter column.

Elution of the column with $CHCl_3$ removed 2-amino-3,5,6 - tricyanopyrazine (III) which was recrystallized from $CHCl_3$ to give 5.36 g. (31.5%) of light yellow needles, M.P. 225° (dec.). Elution with $CH_3CN$ gave an orange solid which was recrystallized from acetone to give pale yellow needles, 3.58 g. of 2-amino-3-hydroxy-5,6-dicyanopyrazine (IV) (22.2%), M.P. 300° (dec.).

Table II summarizes additional examples of the synthesis of the pyrazines III and IV.

TABLE II

| Example No. | Solvent (ml.) | Diiminosuccinonitrile, g. (mmoles) | TsOH·H₂O, g. (mmoles) | Addition order [1] | Diaminomaleonitrile, g. (mmoles) | Temp., °C. | Time, hrs. | 2-amino-3,5,6-tricyanopyrazine, g. (percent) | 2-amino-3-hydroxy-5,6-dicyanopyrazine, g. (percent) |
|---|---|---|---|---|---|---|---|---|---|
| 21 | Ether (100); CH₃CN (100) | 1.06 (10) | 1.85 (10) | a | 1.08 (10) | 40 | 72 | [2] 50 | ([3]) |
| 22 | Ether (50); CH₃CN (50) | 5.30 (50) | [4] 9.25 (50) | a | 5.40 (50) | 40 | 72 | 1.97 (23.2) | |
| 23 | Ether (200); CH₃CN (200) | 21.20 (200) | [5] 37.0 (200) | b | 21.6 (200) | 45 | 48 | 7.15 (21.0) | |
| 24 | Ether (200); CH₃CN (300) | 42.40 (400) | [6] 76.0 (400) | b | 21.6 (200) | 45 | 60 | 8.4 (24.6) | 1.2 (3.7) |

[1] Order of addition—(a) diiminosuccinonitrile to TsOH·H₂O; (b) TsOH·H₂O to diiminosuccinonitrile.
[2] Milligrams.
[3] Presumably this was also formed in Examples 19–21; the columns were not eluted with CH₃CN, with the consequence that this product was not isolated.
[4] In 50 ml. of ether plus 150 ml. of CH₃CN.
[5] In 200 ml. of ether plus 600 ml. of CH₃CN.
[6] In 200 ml. of ether plus 150 ml. of CH₃CN.

The following analyses confirm the structure of 2-amino-3,5,6-tricyanopyrazine, III:

*Analysis.*—Calcd. for $C_7H_2N_6$ (percent): C, 49.41; H, 1.19; N, 49.40. Found (percent): C, 49.48, 49.78; H, 1.49, 1.30; N, 49.48, 49.20.

IR: 3420, 3340, 3230 cm.$^{-1}$ ($NH_2$); 2240 cm.$^{-1}$ (C≡N); 1630 cm.$^{-1}$ ($NH_2$ deformation); 1550, 1480 cm.$^{-1}$ (C=C/C=N).

UV: $\lambda_{max.}^{CH_3CN}$ 207 mμ (ε 17,000); 225 mμ (ε 11,300); 285 mμ (ε 21,300); 375 mμ (ε 6700).

HIGH RESOLUTION MASS SPECTROSCOPY

| M./e. (meas.) | M./e. (calcd.) | Assignment |
|---|---|---|
| 170.0338 | 170.0341 $C_7H_2N_6$ | (M+, molecular ion). |
| 143 | | M+, —(HCN). |
| 118 | | M+, —(2CN). |
| 90 | 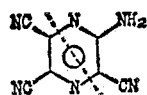 | M+, —($H_2C_3N_3$). |

The following analyses confirm the structure of 2-amino-3-hydroxy-5,6-dicyanopyrazine, IV:

*Analysis.*—Calcd. for $C_6H_3ON_5$ (percent): C, 44.72; H, 1.88; N, 43.47. Found (percent): C, 44.48, 44.66; H, 2.08, 1.93; N, 43.75, 44.00.

IR: 3430, 3340 cm.$^{-1}$ ($NH_2$); absorptions from 3340 to 2780 cm.$^{-1}$ (hydrogen bonded OH/NH); 2270 cm.$^{-1}$ (C≡N); 1685 cm.$^{-1}$ (C=O); 1625 cm.$^{-1}$ ($NH_2$ deformation); 1595, 1530 cm.$^{-1}$ (C=C/C=N).

UV: $\lambda_{max.}^{CH_3CN}$ 225 mμ (ε 14,400): 313 mμ (ε 16,600): 324 mμ (ε 17,550); 338 mμ (ε 10,700).

HIGH RESOLUTION MASS SPECTROSCOPY

| M./e. (meas.) | M./e. (calcd.) | Assignment |
|---|---|---|
| 161.0330 | 161.0338 $C_6H_3ON_5$ | (M+, molecular ion). |
| 134 | | M+, —CO. |
| 133 | | M+, —HCN. |
| 90 | 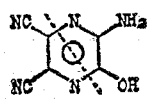 | |

COMPOUNDS I AND II: TETRACYANOPYRAZINE AND 2-HYDROXY-3,5,6-TRICYANOPYRAZINE

The previously mentioned formation of the pyrazines I and II through the uses of two molar proportions of toluenesulfonic acid per mole of diiminosuccinonitrile is illustrated by Examples 25-31.

Example 25

A solution of 152 g. (0.800 mole) of p-toluenesulfonic acid monohydrate in 500 ml. of tetrahydrofuran was added dropwise at room temperature to a stired solution of 40 g. (0.376 mole) of diiminosuccinonitrile in 600 ml. of tetrahydrofuran (under nitrogen atmosphere; 1.5 hours). Stirring at 25° C. was continued for 2 hours. The precipitated ammonium tosylate (e.g., p-toluenesulfonate) was then removed by filtering the solution under nitrogen. To the orange-colored filtrate containing oxalyl cyanide (IX) as shown in Example 37, was added 20 g. (0.185 mole) of powdered diaminomaleonitrile (15-minute addition) followed by stirring at 45° C. for 3 days. The solution was filtered (removing additional ammonium tosylate) and preabsorbed on 150 g. of silica gel (Mallinckrodt's Silic AR CC7) which was placed with petroleum ether on 200 g. of fresh Silic AR CC7 in a 4-inch diameter column.

Elution in turn with benzene and chloroform yielded crude I and II, respectively. Two crystallizations of I from benzene yielded 8.47 g. (25.4%) of pure tetracyanopyrazine as white leaflets melting at 274-276° C. Crystallization of II from benzene gave 1.62 g. (5.1%) of pure hydroxytricyanopyrazine melting at 165-168° C. Elution with ether gave the 2,3-dioxo-1,2,3,4-tetrahydropyrazine-5,6-dinitrile (X) reported by Bredereck and G. Schmötzer. After crystallization from water, this yielded 10.28 g. (34.2%) of white needles melting at 278° C. Bredereck and Schmötzer reported a melting point of 270° C.

Examples 25-30 in Table III illustrate variants of the syntheses of tetracyanopyrazine (I), hydroxytricyanopyrazine (II), 2,3-dioxo-1,2,3,4-tetrahydropyrazine-5,6-dinitrile (X).

TABLE III

| Ex. | Diiminosuccinonitrile g. (mole) | Solvent, THF (ml.) | TsOH·H₂O g. (mole) | Solvent, THF (ml.) | (¹) | Diaminomaleonitrile g. (mole) | Solvent, CH₃CN (ml.) | Temp., °C. | Time, hrs. | Yield I G. | Yield I Percent | Yield II G. | Yield II Percent | Yield X G. | Yield X Percent |
|---|---|---|---|---|---|---|---|---|---|---|---|---|---|---|---|
| 25 | 5.30 (0.05) | ² 40 | 19.0 (0.05) | ³ 250 | 1 | 5.4 (0.05) | 100 | Reflux | 65 | 1.15 | 12.8 | | | 0.96 | 11.8 |
| 26 | 20 (0.189) | 300 | 72 (0.378) | 250 | 2 | 15 (0.139) | 45 | 108 | 4.38 | 17.5 | Trace | | 8.37 | 37.2 |
| 27 | 40 (0.376) | 600 | 152 (0.800) | 500 | 2 | 30 (0.279) | 45 | 72 | 1.25 | 2.5 | | | 15.69 | 35.0 |
| 28 | 50 (0.47) | 700 | 190 (1.0) | 600 | 2 | 25 (0.232) | 50 | 64 | 8.46 | 20.4 | 2.79 | 7.1 | 18.99 | 50.6 |
| 29 | 100 (0.945) | 1,400 | 380 (2.0) | 1,200 | 2 | 65 (0.602) | 50 | 10 | 38.8 | 36.0 | | | 15.0 | 15.5 |
| 30 | 100 (0.945) | 1,200 | 380 (2.0) | 1,000 | 2 | 75 (0.695) | 25 | 20 | 32.3 | 29.3 | | | Not isolated | |

¹ 1=Diiminosuccinonitrile added to TsOH·H₂O; 2=TsOH·H₂O added to diiminosuccinonitrile.
² CH₃CN.
³ Et₂O.

NOTE.—THF=Tetrahydrofuran.

The following analyses confirm the identity of tetracyanopyrazine, I:

*Analysis.*—Calcd. for $C_8N_6$ (percent): C, 53.33; N, 46.67. Found (percent): C, 53.14, 53.54; N, 46.80, 46.40.

IR: 2250 cm.$^{-1}$ (C≡N); 1540 cm.$^{-1}$ (C=C/C=N).

UV: $\lambda_{max.}^{CH_3CN}$ 213 mμ (ε 34,500); 253 mμ (ε 13,300); 295 mμ (ε 6900); 302 mμ (ε 7050); sh. 313 mμ (ε 5500).

| M./e. (meas.) | M./e. (calcd.) | Assignment |
|---|---|---|
| 180.0172 | 180.0184 $C_8N_6$ | (M+, —molecular ion). |
| 128 | | M+, —(2CN). |
| 102 | | M+, —(3CN). |
| 76 | 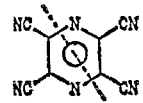 | M+, —(4CN). |

The following analyses confirm the identity of 2-hydroxy-3,5,6-tricyanopyrazine, II:

*Analysis.*—Calcd. for $C_7HON_5$ (percent): C, 49.12; H, 0.59; N, 40.93. Found (percent): 48.91, 48.86; H, 0.59, 0.60; N, 41.41, 41.41.

IR: 3160 cm.$^{-1}$ (—OH); 2260 cm.$^{-1}$ (C≡N); 1560, 1545 cm.$^{-1}$ (C=C/C=N); 1690 cm.$^{-1}$ (C=O, weak band), is mostly in hydroxy tautomer.

UV: $\lambda_{max.}^{CH_3CN}$ 206 mμ (ε 17,900); 257 mμ (ε 9850); 300 mμ (ε 5200); 328 mμ (ε 7430); 385 mμ (ε 1760).

| M./e. (meas.) | M./e. (calcd.) | Assignment |
|---|---|---|
| 171.0170 | 171.0181 $C_7HON_5$ | (M+, —molecular ion). |
| 144 | | M+, —(HCN). |
| 90 | 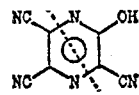 | |

COMPOUND III: 2-AMINO-3,5,6-TRICYANO-PYRAZINE

In the preferred syntheses that follow, aminotricyanopyrazine (III) is prepared in substantial yields.

Example 31

Dry hydrogen chloride was passed above the surface of a stirred solution of 21.6 g. (0.2 mole) of diaminomaleonitrile and 21.2 g. (0.2 mole) of diiminosuccinonitrile in 300 ml. of tetrahydrofuran at such a rate so as to maintain the temperature at 35° C. for 0.5 hour. Stirring was continued for an additional hour; then the solution was filtered and the filtrate evaporated nearly to dryness. The resulting semi-solid was slurried with water and the precipitated product was collected, 21.4 g. (63%) of aminotricyanopyrazine (III).

Example 32

A 38.0 g. (0.2 mole) portion of TsOH·$H_2O$ was dehydrated by azeotropic distillation with benzene. The solution was concentrated to 50 ml., then added to 540 ml. of tetrahydrofuran. To this was added 21.6 g. (0.2 mole) of diaminomaleonitrile whereupon the tosylate salt precipitated. To this stirred heterogeneous solution, at 25° C., was added 21.2 g. (0.2 mole) of solid diiminosuccinonitrile. The mixture warmed spontaneously to 40° C. and was then stirred at room temperature for about 20 hours. The mixture was filtered, the precipitate rinsed with tetrahydrofuran and the combined filtrates evaporated to dryness to give 34.7 g. (100%) of aminotricyanopyrazine.

Example 33

To a solution of 10 g. of diiminosuccinonitrile and 10 g. of diaminomaleonitrile in 200 ml. of tetrahydrofuran at 30° C. was added 2.0 ml. of concentrated sulfuric acid. The temperature rose rapidly to 55° C. The initially dark solution turned yellow and after 1 hour had darkened again only slightly. The mixture was stirred at room temperature overnight. The precipitated ammonium sulfate (4.36 g.) was removed by filtration. Evaporation of the filtrate gave 15.0 g. of crystalline 2-amino-3,5,6-tricyanopyrazine (III).

COMPOUND I: TETRACYANOPYRAZINE

Preferred syntheses of tetracyanopyrazine are given in detail in Examples 34–36.

Example 34

A powdered mixture of 21.2 g. (0.2 mole) of diiminosuccinonitrile and 21.6 g. (0.2 mole) of diaminomaleonitrile was added portionwise to 350 ml. of stirred trifluoroacetic acid at ambient conditions. The addition required 10 minutes during which time the temperature increased from 25° C. to 43° C. Stirring was continued for 30 minutes, then the mixture was heated to 70° C. and 23.2 g. of tetracyanopyrazine was collected on a filter. The filtrate was evaporated and the residue slurried with water to yield 8.6 g. of additional product that was shown by infrared analysis to be a 70:30 mixture of aminotricyanopyrazine and tetracyanopyrazine. The total yield was 71.8% of tetracyanopyrazine and 17.6% of aminotricyanopyrazine.

Example 35

A solution of 5.3 g. (0.05 mole) of diiminosuccinonitrile in 50 ml. of acetonitrile was added over a 15-minute period to a solution of 5.4 g. (0.05 mole) of diaminomaleonitrile in 50 ml. of trifluoroacetic acid and 10 ml. of acetonitrile at room temperature. Occasional cooling was required to maintain the temperature near 25° C. The solution was stirred an additional 1.5 hours then evaporated nearly to dryness and the residue slurried in water. The product was collected on a filter and dried. This yielded 7.75 g. of a mixture of aminotricyanopyrazine and tetracyanopyrazine that was shown by its infrared spectrum to consist of approximately 50% of each component. The overall yield was 90%, i.e., 45% of the theoretical for each product.

Example 36

Preparation of tetracyanopyrazine as substantially the only pyrazine product can be achieved by reaction of diaminomaleonitrile with oxalyl cyanide (IX) as follows:

A solution of 38 g. (0.2 mole) of p-toluenesulfonic acid monohydrate in 50 ml. of tetrahydrofuran was added, over a 12-minute period, to a solution of 10.6 g. (0.1 mole) of diiminosuccinonitrile in 65 ml. of tetrahydrofuran. Stirring was continued for 25 minutes. As shown in Example 37, the resulting reaction mixture was a solution of oxalyl cyanide. To this solution 21.0 g. (0.2 mole) of trifluoroacetic acid was added. Next, a solution of 10.8 g. (0.1 mole) of diaminomaleonitrile in 100 ml. of tetrahydrofuran was added to the above stirred solution over a 15-minute period. The mixture was stirred at room temperature for about 20 hours. The mixture was filtered, the solid rinsed with tetrahydrofuran and the combined filtrates evaporated to a thick paste. The resultant semisolid was slurried with water and the precipitated product, tetracyanopyrazine, collected. On drying, 8.2 g. (48%) of tetracyanopyrazine, I, was obtained.

COMPOUND IX: OXALYL CYANIDE

Example 37

Oxalyl cyanide is a somewhat unstable compound that has now been found to be a valuble intermediate in the synthesis of tetracyanopyrazine. The synthesis of the compound is described as follows:

All operations were conducted in a nitrogen atmosphere. A solution of 19.0 g. (0.1 mole) of toluenesulfonic acid monohydrate in 100 ml. of tetrahydrofuran was added dropwise (ca. 30 minutes) to a solution of 5.3 g. (0.05 mole) of diiminosuccinonitrile in 300 ml. of tetrahydrofuran. Occasional cooling was needed to maintain the reaction temperature near 25° C. As hydrolysis of the diiminosuccinonitrile is substantially instantaneous, the reaction was finished on completion of the addition. The precipitated ammonium tosylate was filtered and rinsed with tetrahydrofuran, the combined filtrates evaporated at low temperature and the residual orange solid sublimed. This yielded about 0.68 g. of oxalyl cyanide, IX.

Oxalyl cyanide is fully characterized by the following analyses:

*Analysis.*—Calcd. for $C_4N_2O_2$ (percent): C, 44.49; H, 0; N, 25.93. Found (percent): C, 44.46, 44.43; H, 0.26, 0.46; N, 25.93, 25.67.

IR: 2230 cm.$^{-1}$ (C≡N); 1735 cm.$^{-1}$ (C=O).

M.P.: 61–62° C.

MASS SPECTRUM

| M./e. (meas.) | M./e. (calcd.) | | Assignment |
|---|---|---|---|
| 107.9953 | 107.9960 | $C_4N_2O_2$ | Molecular Ion-M$^+$. |
| 82 | Low resolution | | M$^+$—CN. |
| 54 | do | | M$^+$/2. |
| 26 | do | | —CN. |

UTILITY

The novel products of this invention have various utilities. Some of the compounds are useful for converting to other compounds, e.g., VIII to III and IV, VI to V, and IX to I, II and X. Tetracyanopyrazine, 2-hydroxytricyanopyrazine, and 2-aminotricyanopyrazine show growth retardation of broad-leaved plants, specifically chenopodium. Aminotricyanopyrazine, 2-amino-3-hydroxy-5,6-dicyanopyrazine and 2,3-diamino-5,6-dicyanopyrazine show strong fluorescence and thus are useful as whitening agents.

These utilities are illustrated as follows:

Example A

To 50 ml. of concentrated sulfuric acid there was added slowly, with stirring, 5.0 g. of tetracyanopyrazine (I). The reaction mixture warmed slightly. It was stirred overnight at room temperature, during which time all the solid dissolved. Then 50 ml. of water was added slowly, followed by heating at reflux for 2 hours. The reaction mixture was filtered hot and the filtrate stored at 5° C. for 7 days. The colorless needles which precipitated were collected by filtration and air-dried to obtain 7.78 g. of pyrazinetetracarboxylic acid dihydrate (96% yield of high purity product). This acid is useful for conversion to its dianhydride and reaction with 2,5-diamino-1,3,4-thiadiazole to obtain a film-forming polyimide characterized by unusually high temperature oxidation stability as shown by S. S. Hirsch, J. Polymer Sci. A–1, 7, 15–22 (1969).

Example B

Compound II is useful as a plant growth regulant. When 2-hydroxy-3,5,6-tricyanopyrazine was employed at 100 p.p.m. concentration in a 2% agar nutrient solution, it showed 25% inhibition of germination of seeds of the weed *Chenopodium rubrum* and 50% kill when applied at the same concentration to growing plants of the same weed.

Example C

Compound III is also useful as a plant growth regulant. When 2-amino-3,5,6-tricyanopyrazine was employed at 100 p.p.m. concentration in a 2% agar nutrient solution, it showed 25% inhibition of root growth on germinating seeds of the weed *Chenopodium rubrum* and of the grass *Poa annua*.

Example D

Compound III is further useful as a fluorescent brightener for textile fabrics. In 200 ml. of boiling water, 0.25 g. of 2-amino-3,5,6-tricyanopyrazine was dissolved. A 5-g. swatch of polyacrylonitrile fabric was entered in the bath and boiled for 30 minutes. The fabric was rinsed twice with water and air-dried. Compound III showed affinity for the polyacrylonitrile fibers. When the treated fabric was observed under ultraviolet light, it showed a soft, white fluorescence. An untreated fabric control showed no fluorescence.

Example E

Compound IV is useful as a fluorescent brightener for textile fabrics. A dilute solution of 2-amino-3-hydroxy-5,6-dicyanopyrazine in acetonitrile showed purple-white fluorescence when viewed under ultraviolet light. Acetonitrile alone shows no fluorescence. Compound IV can be applied to fabrics by the procedure of Example F to yield a fabric that shows fluorescence under ultraviolet light.

Example F

Compound V is useful as a fluorescent brightener for textile fabrics. In 2 ml. of dimethylformamide 0.25 g. of 2,3-diamino-5,6-dicyanopyrazine was dissolved. This solution was added to 125 ml. of 0.4% aqueous detergent solution and the resulting bath was heated to 54.4° C. A 5-g. swatch of 66-nylon fabric was entered in the bath and stirred at 54.4° C. for 25 minutes. The fabric was rinsed twice with water and air-dried. Compound V showed affinity for the fabric. When observed under ultraviolet light, the treated fabric showed a soft, white fluorescence. An untreated control fabric showed no fluorescence.

Example G

Compound VII is useful as an acid scavenger. It is particularly useful for removing acids from aqueous solutions since it is insoluble in water. For example, a dilute aqueous solution of hydrochloric acid is rendered free of acid by percolating the solution slowly through a bed of finely divided compound VII.

Since obvious modifications and equivalents in the invention will be evident to those skilled in the chemical arts, I propose to be bound solely by the appended claims.

The embodiments of the invention in which an exclusive property or privilege is claimed are defined as follows:

1. A cyanide of the formula

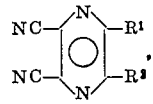

$R^1$ being CN, $NH_2$ or OH and $R^2$ being CN or $NH_2$.

2. The cyanide of claim 1 named tetracyanopyrazine.
3. The cyanide of claim 1 named 2-hydroxy-3,5,6-tricyanopyrazine.
4. The cyanide of claim 1 named 2-amino-3,5,6-tricyanopyrazine.
5. The cyanide of claim 1 named 2-amino-3-hydroxy-5,6-dicyanopyrazine.
6. The cyanide of claim 1 named 2,3-diamino-5,6-dicyanopyrazine.

References Cited

UNITED STATES PATENTS

| | | | |
|---|---|---|---|
| 2,200,689 | 5/1940 | Eckert et al. | 260—250 R |
| 2,722,540 | 11/1955 | Carter | 260—250 R |
| 2,818,423 | 12/1957 | Carter | 260—250 R |

OTHER REFERENCES

Bredereck et al.: Lieb. g's Annalen der Chemie, vol. 600, pp. 95–108 (1956).

NICHOLAS S. RIZZO, Primary Examiner

U.S. Cl. X.R.

8—1 W, 77; 71—92; 117—33.5 T; 252—301.2 W; 260—465.5 R